Oct. 14, 1930.　　　　S. G. WINGQUIST　　　　1,778,136
POWER TRANSMISSION DEVICE
Filed Feb. 1, 1926　　　5 Sheets-Sheet 1
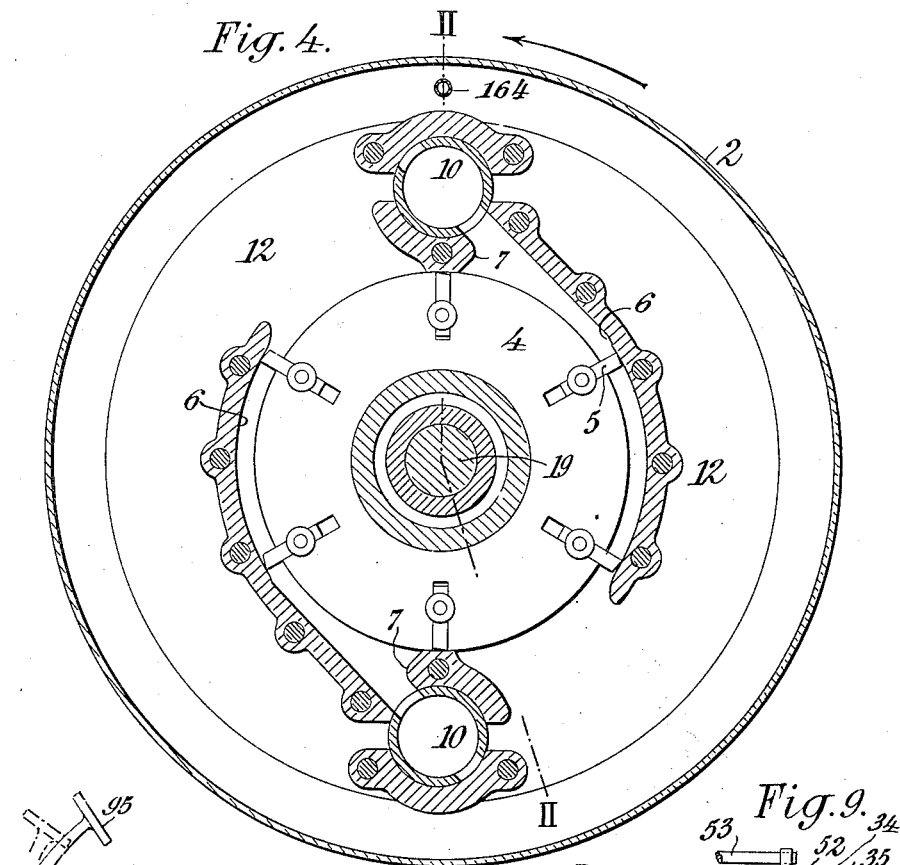
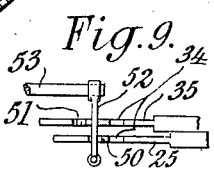
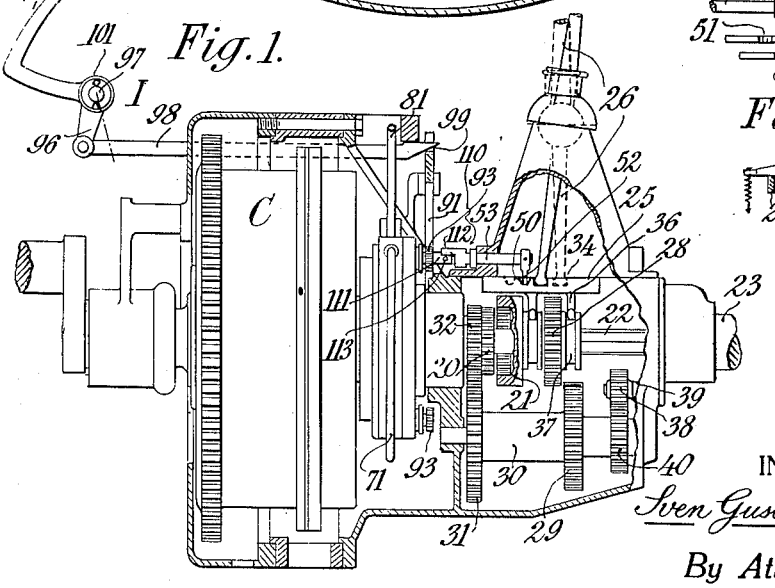
INVENTOR:
Sven Gustaf Wingquist
By Attorneys,
Fraser, Myers & Manley

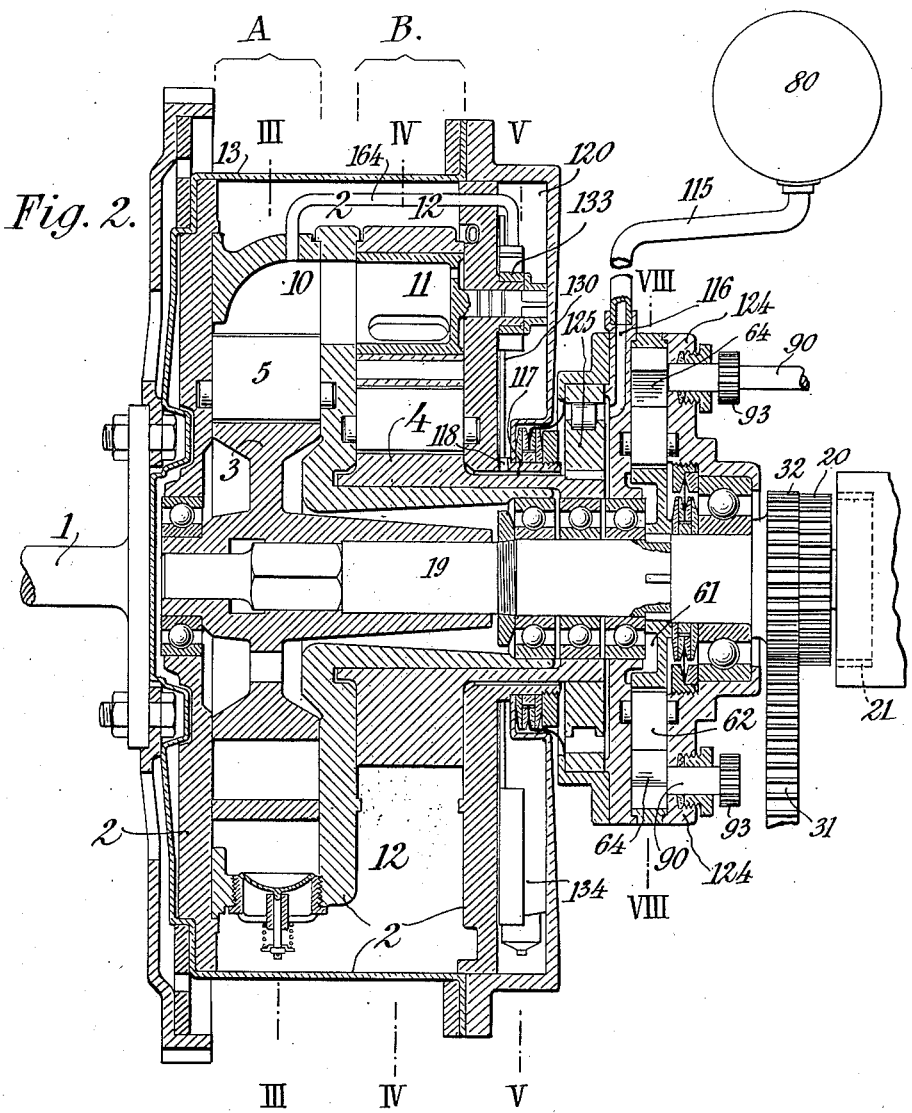

Oct. 14, 1930. S. G. WINGQUIST 1,778,136
POWER TRANSMISSION DEVICE
Filed Feb. 1, 1926 5 Sheets-Sheet 3

INVENTOR:
Sven Gustaf Wingquist,
By Attorneys,
Fraser Myers & Manley

Oct. 14, 1930. S. G. WINGQUIST 1,778,136
POWER TRANSMISSION DEVICE
Filed Feb. 1, 1926 5 Sheets-Sheet 4

INVENTOR
Sven Gustaf Wingquist,
By Attorneys,
Fraser, Myers + Manley

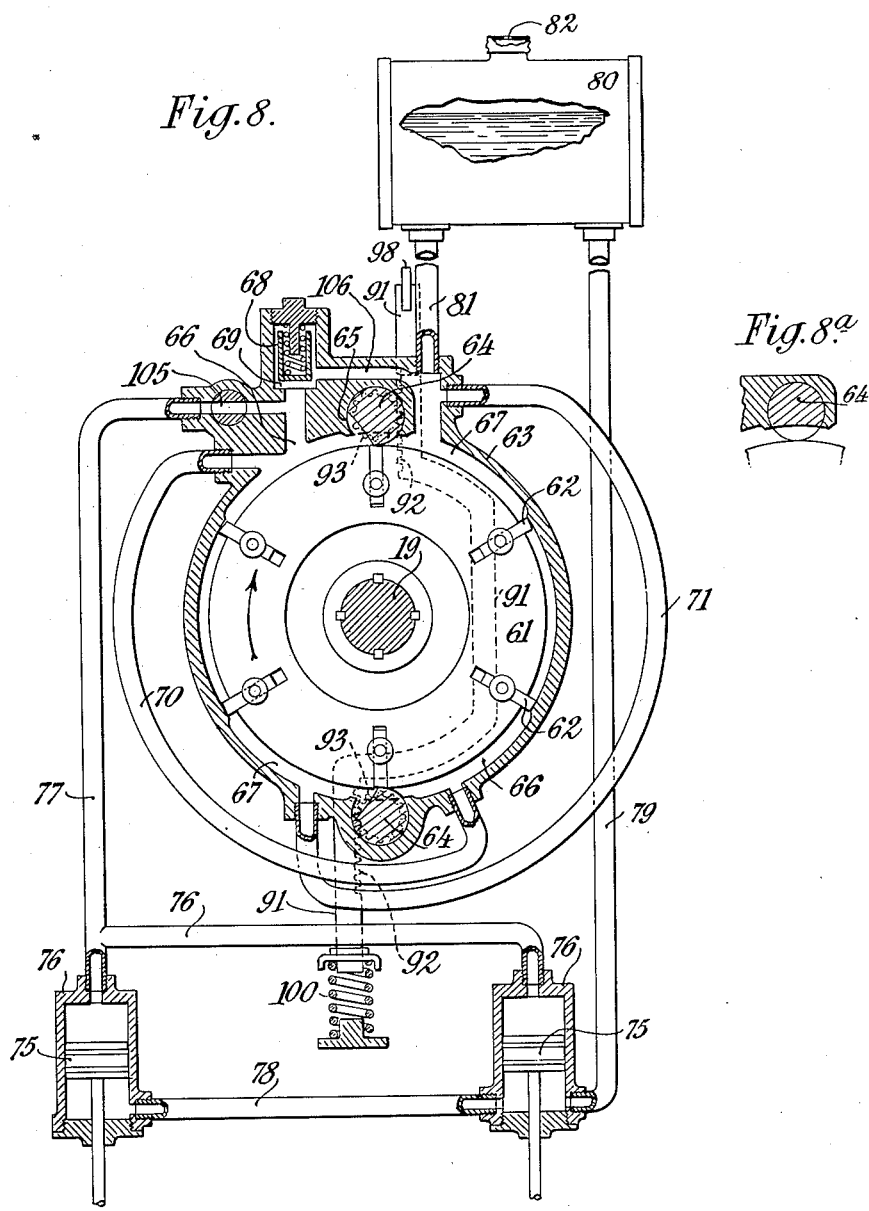

Patented Oct. 14, 1930

1,778,136

UNITED STATES PATENT OFFICE

SVEN GUSTAF WINGQUIST, OF GOTTENBORG, SWEDEN

POWER-TRANSMISSION DEVICE

Application filed February 1, 1926. Serial No. 85,291.

This invention relates to improvements in power-transmitting devices of the type particularly applicable to automobile drives and permitting variable speed transmission from the internal combustion engine to the propeller shaft of the vehicle.

One object of the invention is to provide a transmission device having great flexibility and yet being relatively simple in construction, whereby its cost is materially reduced, the normal direct drive and speed reductions being had through a hydraulic transmission, but, at the same time, additional emergency speed reductions for exceptional conditions in load being provided by combining the hydraulic transmission with mechanical gearing. The mechanical gearing also includes a reverse gear.

A further object of the invention is to provide a clutch brake of novel construction, which is automatically thrown into operation whenever the gear shift of the mechanical transmission is set in neutral position.

The invention further contemplates the combination of a hydraulic transmission device with a hydraulic braking system, the braking energy being supplied by a moving part of the transmission system instead of by the operator of the vehicle.

The invention also provides improved means for maintaining reserve fluid in communication with the hydraulic transmission and at a definite hydrostatic pressure, whereby the action of the transmission is rendered more positive and regular.

Certain structural improvements are also provided in hydraulic power transmission devices which render the automatic speed or transmission ratio control of such devices more positive, and further improvements resulting in a substantially perfect balance of fluid pressure acting on the major parts of the fluid-pumping systems, whereby one-sided thrusts on the transmission bearings are practically eliminated.

Further objects of the invention will be pointed out in connection with the following detailed description, reference being had to the accompanying drawings in which:

Figure 1 is a side elevation of the assembled power-transmitting device, also showing the hydraulic brake formed as an integral part of such device.

Fig. 2 is a side elevation of the hydraulic transmission which is adapted to be carried within the engine fly-wheel shown in Fig. 1, and also shows details of the hydraulic pump-braking device.

Fig. 4 is a vertical cross-section taken through the receiving pump along the line IV—IV as shown in Fig. 2.

Fig. 8 is a vertical section transverse to the transmission axis, taken along the line VIII—VIII in Fig. 2, showing the details of the hydraulic clutch brake and vehicle braking device.

Fig. 8ª shows the rotary abutment in the open position.

Figs. 9 and 10 illustrate in enlarged detail, and respectively in plan and side elevation, the automatic control of the clutch brake as it is connected to the mechanical transmission gear-shift mechanism.

Figure 3:
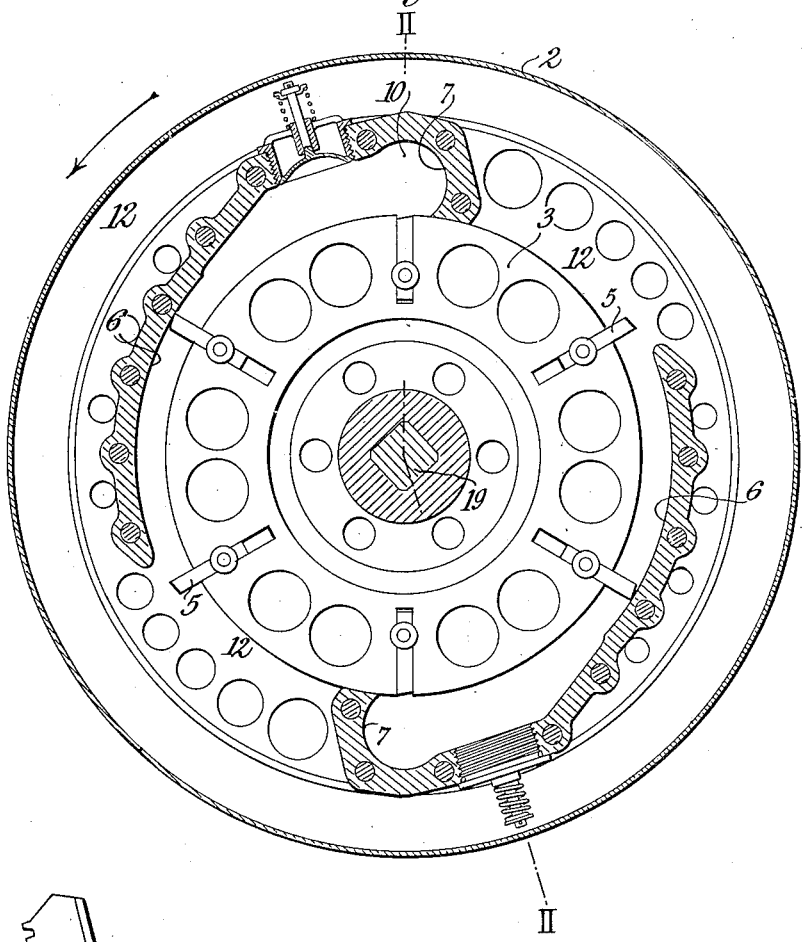
Fig. 3 is a vertical cross-section through the delivery pump of the hydraulic transmission, taken along the line III—III, Fig. 2.
Figure 7:
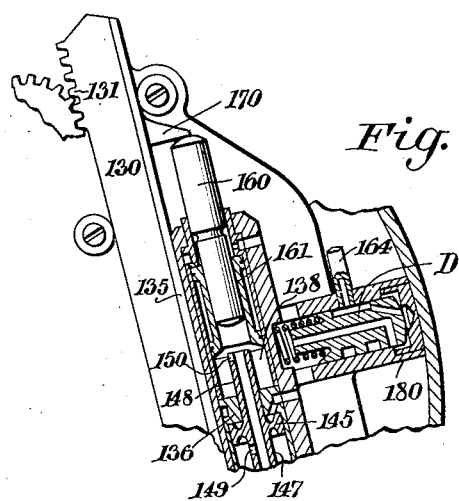
Fig. 7 shows the main valve control pistons in Fig. 2 position, the view being taken along the same section as that chosen in Figs. 5 and 6.

For the purpose of describing the present invention it will be unnecessary to enter into detailed description of the hydraulic transmission illustrated, as such transmission, except for minor structural differences, is fully described in my United States Letters Patent No. 1,603,179, granted October 12, 1926. The hydraulic transmission, details of which are illustrated in Figs. 2, 3 and 4, is of the type known as the differential pumping transmission. The engine power is applied through shaft 1, which we will call the driving shaft, to the transmission housing 2. Within the housing a driven rotor 3 and a stator 4 are mounted. Both the driven rotor and the stator are formed as the internal elements of two rotary vane pump devices. As seen in Figs. 3 and 4, these elements are both provided with a number of vanes 5, which slide in slots cut in the internal pump elements 3 and 4. The housing 2, common to both the internal pump elements 3 and 4, is provided with working surfaces 6 and abutments 7 adapted to cooperate with the driven rotor and the stator to form two separate and distinct pump devices.

The pump formed between the driven rotor 3 and the common housing 2 will hereinafter be referred to as the delivery pump or pump A, as indicated in Fig. 2, and the pump formed between the stator 4 and the common housing 2 will be referred to as the receiving pump and will be generally referred to by the letter B. It will be understood that the term "receiving pump" applies to a form of pump which receives fluid under pressure and which in its operation adds to the torque applied to the driven elements of the transmission, such pump therefore possessing the function of a motor.

Communication may be established between the two pumps A and B so that, if the external housing 2 be rotated by the engine around the driven rotor 3, fluid will be forced from the pump A into the receiving pump B. This fluid under pressure entering the pressure chambers of the pump B will exert a thrust against the vanes 5 of such pump, but the element 4 being under certain conditions immovable, there will be a fluid reaction against the abutments 7 carried by the housing 2, which fluid reaction is favorable to the rotation of the housing and acts to materially increase the torque on such housing, such increased torque being transferred to the driven rotor 3 through increased fluid pressure acting upon the vanes thereof.

Communication between the delivery pump A and receiving pump B is had through the pressure channel 10, in the right-hand end of which a rotary sleeve valve 11 is mounted. This valve is adapted to control the flow of fluid from the delivery pump to the receiving pump. In one position the valve will prevent any escape of fluid from the delivery pump. As is well understood, if under such circumstances power is applied to the rotor or housing 2, the internal rotor 3 cooperating with such housing to form the delivery pump will be driven without any slip whatever, the fluid locked between the cooperating vanes and abutments of such pump providing a substantially rigid connection between the driving and driven elements.

In another position the valve 11 vents the fluid acted upon by the delivery pump into the idle fluid space 12, surrounding the pumps, and within the oil-retaining shell or casing 13 surrounding the pumps. If the port of the valve providing this venting of the delivery pump be opened wide, there will be practically no delivery of power through the transmission, the driving part rotating freely about the driven rotor 3 because, while fluid is being delivered by the pump A formed between the housing and the driven rotor, no resistance is offered to the flow of this fluid, and consequently no torque will be transmitted to the driven element. It will furthermore be apparent that if the vent port controlled by the valve 11 be gradually closed, fluid delivered by the pump A will meet with greater and greater resistance to flow, with a consequent building up of fluid pressure, which will result in a driving force being gradually applied to the driven rotor 3.

When the valve 11 is adjusted to open the vent to the idle fluid or suction chamber 12 of the transmission, the transmission is adjusted to a condition of free engine. As the vent is gradually restricted by the movement of the valve, a gradual clutching action will be brought about. The valve then upon a further movement opens the communication between the pressure chamber of the delivery pump and the receiving pump. At such time the transmission is adjusted for a hydraulic speed reduction, the speed ratio between the driving and driven rotors being determined by the relative volumetric capacity of the delivery pump and the receiving pump.

If the capacity of the delivery pump per revolution is very large compared with the capacity of the receiving pump per revolution, a comparatively slight relative movement between the driving and driven elements of the delivery pump will result in the delivery of oil sufficient to fill the chambers of the receiving pump, and this condition obviously corresponds to a slight gear reduction, that is to say, the driven rotor lags behind the driving rotor only slightly.

If, on the other hand, the capacity of the receiving pump were made somewhat larger in comparison with that of the capacity of the delivery pump, a greater slip would occur between the driving and driven elements in order that the delivery pump could deliver sufficient fluid to meet the volumetric requirement per revolution of the receiving pump, and this obviously would occasion a greater speed reduction in the transmission.

The automatic mechanism for controlling the position of the main valve 11 in accordance with the conditions of load and engine speed and other features herein referred to are described and claimed in my copending United States applications, Serial Nos. 575,673, applied for July 17, 1922; and 91,758 applied for March 2, 1926, and in my United States Patents Nos. 1,610,405, granted December 14, 1926; 1,610,406, granted December 14, 1926; 1,645,565 granted October 18, 1927; 1,673,542, granted June 12, 1928, and 1,677,996, granted July 24, 1928. It need only be here stated that for the purpose of a general consideration of the operation of the power transmission device according to the present invention, the valve control mechanism is at all times sensitive to the combined and opposing actions of centrifugal force and fluid pressure, the fluid pressure being an index of the torque load, and the centrifugal force an index of the speed of the motor. A valve so constructed and properly adjusted actually controls the operation of the slipping clutch and hydraulic change speed gear in much the same way that the clutch and change speed gear in the usual vehicle would be manipulated by an expert driver.

As shown in Fig. 1, the hydraulic clutch and change speed gear C, which takes the place of the usual engine flywheel, is combined with a mechanical gear transmission of usual type. The mechanical transmission is provided with a direct drive coupling between a toothed element 20, which is rigidly connected to the driven shaft 19 of the hydraulic transmission, and an internally-toothed member 21, which is slidably splined to a shaft 22 connected to the propeller shaft 23 of the vehicle. When the internal and external toothed elements 20 and 21 are shifted into engagement by actuating the selector-rod 25 by means of the usual gear-shift lever 26, the mechanical transmission is set for direct drive.

The mechanical transmission is also provided with a single speed reduction and one reverse speed. The forward gear reduction is obtained by shifting the gear 28, which is slidably splined on the shaft 22 connected to the propeller shaft of the vehicle, into engagement with the gear 29 which is mounted on the jack-shaft or counter-shaft 30. The jack-shaft is driven in the usual manner by a gear 31, which is permanently meshed with a driving gear 32 rigidly mounted on the shaft delivering power to the mechanical transmission. As is well understood, when the transmission lever 26 has been shifted from neutral position into the position corresponding to a reduced speed, the power is not transmitted directly from the shaft which carries gear 32, to the shaft 22, but is first delivered to the jack-shaft 30 through the gear 31 and is then delivered through gears 29 and 28 to the driven shaft 22.

When it is desired to reverse the drive, the gear-shift lever 26 is brought into engagement with the actuating notch 34 of the selector-rod 35 controlling the shifting fork 36, which fork, according to the usual practice, engages a thrust collar 37 formed on one face of the gear 28. The lever 26 is then moved into the position for reverse. In such position the selector-rod acting on the shifting fork will have moved the gear 28 into engagement with the reverse gear 38. The reverse drive, according to the usual practice, is constructed as shown, a relatively small pinion 38 being mounted for free rotation on a stud 39, the pinion 38 permanently meshing with a gear 40 rigidly mounted on the jack-shaft 30. As is apparent, the pinion 38 will rotate in a direction opposite to that of the rotation of the jack-shaft.

As in the case with all mechanical gear shifts for use in automobiles, a clutch brake is required. The clutch brake, according to usual practice, takes the form of a simple friction pad which engages the releasable part of the clutch and accordingly brings such part to rest, so that if the transmission be set in neutral position, and the car is standing still, the low speed gear 28, for example, which will also be stationary because it is connected to the propeller shaft of the car, can be brought into quiet engagement with the gear 29 on the jack shaft because of the action of the clutch brake above referred to, which, if permitted to operate for a relatively brief interval of time, will bring the driven element of the clutch, when it has been released, to a state of rest. With the engine rotating there will always be a certain drag on the driven element of the clutch, even though the clutch be released to the greatest possible extent, and this drag will be ample to cause the driven element of the clutch to take up the speed of the engine and cause the gears within the mechanical transmission, which, when the transmission is set in neutral, are entirely free to rotate, to spin at substantially the same speed as if they were directly connected to the engine. If an attempt is made to mesh either of the gears on the shaft 22 with one of the gears thus rotated by the engine, very unpleasant sounds will be produced, and with considerable likelihood of serious injury to the gears.

Heretofore the clutch brake has been brought into operation by a movement of the clutch pedal of the car to its extreme forward position, thus insuring that the releasable element of the clutch has been disconnected from the driving element before the clutch brake is applied to such releasable driven element. This clutch braking action normally occurs every time the clutch pedal is depressed by the operator. It is well understood that the clutch pedal is very frequently depressed when the operator is not required to shift gears or has no intention of shifting gears, and this results in excessive wear of the clutch-braking means, much of which is entirely unnecessary. According to the present invention this difficulty is overcome in two ways. In place of the usual friction pad device which is utilized to check the rotation of the driven element of the clutch, a hydraulic pump is operatively connected to the said driven shaft. This pump, when not set to act as a brake, normally circulates fluid from its pressure chambers to its idle fluid or receiving chambers without requiring practically any energy whatever to rotate it. When, however, a braking action is required, the flow of fluid between the pressure and suction chambers of this pump is restricted, thus building up a pressure which resists the rotation of the driven pump element. It will be seen that a type of clutch brake is now provided which is possessed of exceptional durability. Since the fluid medium upon which the pump operates is one possessing suitable lubricating properties, the pump will show practically no wear over long periods of use, and so would remain operative even if subjected to exceptional duty. But in addition to this improved clutch braking device the invention provides a novel means for automatically throwing it into operation. The automatic control of the hydraulic pump brake is effected through a mechanical connection between the gear shifting mechanism and an element in the pump which controls the circulation of fluid. The device is shown in Figs. 1, 9 and 10. The two selector rods 25 and 35 of the mechanical transmission are provided respectively with cam notches 50 and 51. Co-operating with these cam notches is a lever 52 which is rigidly fastened to a rock shaft 53 controlling an element within the hydraulic pump brake, which regulates the flow of fluid in such pump. When the gear shift lever 26 is moved into the neutral position shown in solid lines, the two cam notches 50 and 51 will be moved to a position immediately under the brake control lever 52, and this lever will drop into such notches, thereby causing a rotation of the shaft 53 which results in the application of the clutch brake. This active position of the clutch brake actuating lever is shown in Figs. 1 and 10. If after the clutch brake has reduced the speed of the driven element of the clutch to that required for quiet engagement of the desired gears, and the gear shift lever 26 be moved to couple such gears together, the actuation of either one of the gear selector rods 25 or 35 will cause one or the other of the cam notches 50 or 51 to elevate the brake control lever 52 to the position shown in Fig. 10, in which position the clutch brake is thrown out of operation.

From the foregoing description it will be apparent that the clutch brake is never operative when the gears are in driving connection, and is automatically thrown into operation when the mechanical gear shift is in neutral position, at which time only the speed of the gears connected to the free element of the clutch should be controlled.

Details of the fluid pump braking device are shown in Fig. 8. It may be here pointed out that the same braking device which is automatically controlled by the gear shift lever 26 to provide a clutch braking action when the gear shift is set in neutral position, is also adaptable to other uses requiring the delivery of fluid under pressure. A very important use of this pump is illustrated in Fig. 8, and will now be described.

Rigidly fastened to the shaft 19 which receives power from the engine, is an internal rotor 61 carrying vanes 62 which co-operate preferably with a stationary external housing 63 in which are mounted abutments 64 to provide a rotary vane pump. The only respect in which this pump differs from pumps A and B previously described, and which type of vane pump is well known in the art, is that instead of fixed abutments as those illustrated, for example, at 7 in Fig. 3, the abutments 64 of the brake pump are rotatable. The two abutments, as shown, are cylindrical and adapted for free rotation within bores 65 in the main casting constituting the external housing 63. As shown, the upper and lower portions of the housing casting are extended to provide a suitable mounting for the abutments and fluid connections and control means therefor required by the pump and its various appurtenant devices.

It will be apparent that if the abutments 64 be rotated into the position indicated by the dotted lines in Fig. 8 (see Fig. 8ª) an entirely unobstructed communication will be established between the pressure chamber 66 and suction or idle fluid chamber 67 of the rotary vane pump. With the abutments in this position practically no effort whatever will be required to rotate the internal rotor 61 of the pump, and consequently no braking action will take place.

The automatic control of the abutments 64 previously referred to in connection with the automatic clutch braking function, at no time ever need rotate the abutment to the fully active position indicated in solid lines in Fig. 8, as in such position the abutment provides practically a fluid lock, the fluid being trapped in the pressure chamber and not permitted to escape, except at excessive pressures, which escape is permitted through a relief valve 68 which will be more particularly described hereinafter. The braking action arising from a complete closing of the abutment would be far too violent for the uses of a clutch brake. The great pressures which can be built up, however, within the pump by fully closing the abutment, are, however, utilized to advantage in producing a braking action on the vehicle itself. This is brought about in two ways.

In the first place, if the shaft 19 be rotated either by the engine or by the movement of the car in coasting down a hill, for example, a pumping action as described above will be set up by the movement of the vanes 62 toward the abutments. If the abutments are adjusted to completely close communication between the pressure and suction chambers of the pump, and the tension on the relief valve 68 be relatively high, a very considerable pressure will be built up within the pressure chambers of the pump, and this pressure will act against the pump vanes to produce a very decided direct braking torque on the shaft 19. The degree of this braking torque will manifestly depend upon the loading of the relief valve 68. If this valve, for example, is adjusted to lift off its seat 69 at a pressure of 100 pounds to the square inch, this pressure will prevail within the two pressure chambers and will exert a thrust on the vanes which are active at any moment equal to the product of the exposed area of such vanes and the fluid pressure. If the total area of the opposed active vanes, for example, is five square inches, and the relief valve is set to give rise to a pressure of 100 pounds to the square inch, a braking force of 500 pounds will be exerted on an arm, let us say, six inches long, this latter figure representing the mean radius of the exposed pressure area of the vanes rotating about the shaft 19. 500 pounds acting on a six-inch arm will produce a braking torque of 250 pounds-feet, which torque acts directly upon an element of the vehicle drive producing its braking effect upon the wheels of the car through the differential and rear axles.

In addition to the direct braking action upon the shaft 19, the brake pump is utilized in still another way to further increase the braking effect upon the motion of the vehicle itself. It will be borne in mind that while the brake pump is provided with two abutments and consequently has two pressure chambers and two suction chambers 66 and 67 respectively, that the two like chambers on opposite sides of the pump are always in open communication one with the other through conduits 70 and 71, the conduit 70 being a pressure conduit and 71 the suction or idle fluid conduit. Therefore it will be understood that any fluid-controlled means connected to either the pressure or suction chambers 66 and 67 at the top of the pump will also be in effective communication with the corresponding pressure and suction chambers at the lower part of the pump, so that fluid delivered from both pressure chambers will act upon any control devices connected directly to the upper pressure chamber. The operation of the relief valve 68 has already been explained, as well as the pumping action that is effected when the abutments 64 are rotated to the closed position and the internal rotor 61 is set in motion. Bearing in mind the fact that the rotation of the pump can be caused to set up any desired fluid pressure having a maximum value, in accordance with the regulation of the relief valve 68, it will be readily understood that a source of fluid pressure is hereby available for actuating hydraulic brakes, as they are now peculiarly termed in the art, such brakes comprising one or another of the usual frictional braking devices acting upon the brake drums of the car, or a similar device connected to the propeller shaft of the car, and actuated by fluid-controlled pistons. Such hydraulic braking pistons are illustrated schematically. Two pistons 75 within cylinders 76 which are in communication with the pressure chamber 66 of the brake pump through a conduit 77, are utilized to actuate any suitable type of mechanical or frictional braking device, which device is not illustrated. A conduit 78 connects the two chambers of the brake cylinders which are not exposed at any time to the direct action of fluid pressure from the pump, and another conduit 79 connects one of said chambers with the reserve fluid container 80. By this means any fluid which may leak past the brake control piston 75 will be caught and returned to the reserve fluid system. Furthermore, the construction described provides a practically airtight working chamber for the pistons 75, which protects the pistons and cylinders from the action of moisture or wear due to foreign particles being picked up on the working surfaces, as would necessarily be the case if the pistons were operating in open-ended cylinders. It will be seen that the suction chambers of the pump are at all times also in direct communication with the reserve fluid container 80 through the conduit 81, by which means the pump is always insured of an adequate supply of oil if the oil level in the container 80 is maintained, and, furthermore, by keeping the pump completely filled with oil (or whatever the fluid medium employed for transmission purposes may be), any air that would otherwise be present in the pump, and which would tend to become mixed with the transmission fluid, will be expelled and pass out through the vent 82 in the fluid reserve tank.

For the purpose of effectively varying the pressure of fluid acting upon the brake pistons 75, the shaft 90 which controls the abutment 64 is connected to an adjusting device under the control of the operator. Furthermore, the two abutments 64 shown at the upper and lower portions of the pump housing are operatively connected together by means of a bent connecting rod 91 upon either end of which is formed a rack 92, which racks engage pinions 93, the latter being rigidly fastened to the abutment shafts 90 projecting through the pump housing. The pinions 93 are shown in Fig. 1 and Fig. 8.

The control mechanism which may be actuated by the operator of the vehicle to adjust the position of the abutment 64 to gradually restrict the communication between the pressure and suction chambers of the pump, and consequently gradually build up a fluid pressure within the transmission which may be utilized directly to resist the rotation of one of the moving parts of the car, such as the shaft 19, or to apply frictional brakes under the hydraulic control of the pistons 75, may be constructed in the following manner:

A control pedal 95 may be conveniently positioned in front of the driver in accordance with the usual arrangement of the brake or clutch pedal. The pedal 95 controls a bell-crank arm 96 suitably pivoted on a shaft 97. The lower arm of the bell-crank 96 is loosely pinned to a rod 98 at the right-hand end of which an inclined cam surface 99 is formed. The end of the rod 91, which rod, as before described, carries the racks 92 for actuating the abutment pinions, is slotted to receive the horizontally-slidable cam rod 98, the inclined cam surface of which is positioned relatively to the rack actuating bar 91 so that when the brake pedal 95 has been depressed to its maximum point, the cam surface 99 will have effected the maximum depression of the rack bar 91, thereby rotating the pump abutments 64 into the fully closed position, and when the brake pedal is entirely released the cam rod 98 will be shifted to the left to a position in which the cam surface 99 will have permitted the rack bar to return to its normal position in which the abutments are fully open. The return of the rack bar to such normal position is effected by a compression spring 100 acting against the lower extremity of the rack bar 91. The brake pedal 95 may be restored to its normal inoperative position by any suitable means such as a coiled spring 101 fastened to the shaft on which the brake pedal is pivoted.

The brake control above described obviously provides all degrees of pump abutment adjustment from wide open to the fully closed position, so that the degree of braking, up to the maximum pressure limit at which the relief valve 68 is set, will be determined by the position of the brake pedal 95. A light pressure on such pedal, causing it to move only a slight distance toward the floor, will produce only a slight restriction of the passage between the pressure and suction chambers of the pump, and consequently only a slight braking action, and a further movement will increase the braking action up to any desired point.

A valve 105 is provided in the conduit 77 connecting the pressure chamber of the pump with the hydraulic brake-actuating pistons. This valve may be closed when it is desired to utilize only the direct braking action of the pump upon the shaft 19 due to the resistance offered to the fluid flow by the closure of the abutment 64. When the brake is utilized in this manner, when considerable braking duty is required, considerable pressure will be developed in the pressure chamber up to that at which the relief valve 68 lifts off its seat, and thereafter a constant braking effort will be exerted upon the shaft 19 through the circulation of oil from the delivery pump through the relief valve chamber and a by-pass conduit 106 which communicates directly with the suction chamber of the pump on the opposite side of the abutment.

Ordinarily the valve 105 is left open, so that both the direct drag of the pump on the shaft 60 and the hydraulic braking action of the pistons 75, will be utilized simultaneously.

The control of the brake pump abutment 65 by the brake pedal 95 is rendered independent of the automatic control of such abutments for clutch-braking purposes through a lost motion connection 110 between shaft 53 and the hub projection 111 of the shaft 90 of the upper abutment 64. This connection is a simple one-way drive comprising a collar mounted on shaft 53, which collar is provided with a driving finger 112 which projects beyond the end of shaft 53 and normally engages a driving pin 113 projecting radially from the hub projection 111. If the brake pedal is released and under the influence of spring 100 is returned to its normal inoperative position, and the automatic clutch brake actuating lever 52 is in inoperative position, the finger 112 will be in contact with the pin 113 of the lost motion drive. If the gear shift be now set in neutral position, the clutch brake actuating lever 52 will fall into the notches in the selector rods and rotate shaft 53, the rotation being imparted to the pump abutments 64 through the lost motion connection 110, the rotation of finger 112 causing a like rotation of the pin 113 and the abutment. When, however, the gear shift is positioned to establish a drive through the mechanical transmission, and it is desired to actuate the vehicle brake, pressure on the brake pedal 95 will, as hereinbefore described, result in a downward movement of the rack bar 91, and a corresponding rotation of the pump abutments, the abutments being entirely free to move in a direction to apply the brakes, because of the fact that the lost motion connection 110 between the abutment hub projection 111 and the shaft 53 is a one-way drive; that is to say, the pin 113 on the abutment hub projection is free to rotate away from the driving finger 112 and quite independently thereof.

It will be observed that the reserve fluid receptacle 80, in addition to the connections previously described, is connected to the interior of the hydraulic transmission housing through a conduit 115 comprising a bore 116 in the housing 124 of the stationary stator checking device 125 and the fluid brake pump. The bore 116 communicates with an idle fluid space within the portion of the housing 124 occupied by the stator roller ratchet checking device and thence through a groove or channel 117 in the rotating housing of the transmission proper and a port 118, with the idle fluid chamber 12 of the transmission, which chamber is common to both of the pumps A and B of the transmission and also the compartment 120 occupied by the automatic transmission ratio control mechanism. By this means there is provided at all times a connection between the reserve fluid receptacle 80 and the interior of the rotating housing of the hydraulic transmission, and consequently the transmission will always be maintained entirely full of the fluid transmission medium so long as the reserve fluid receptacle is kept at least partially full.

This reserve fluid receptacle is preferably mounted at a certain elevation above the hydraulic transmission so that the fluid within the transmission will be kept under a slight hydrostatic pressure, which pressure insures the complete filling of the pumps at every vane intake and also insures the expulsion of air from the transmission proper, which feature is important. If any appreciable amount of air is trapped within the transmission, apart from the fact that excessive pressures might be developed, which, if they did not injure the transmission, would certainly tend to cause excessive leakage at all bearing points exposed to the fluid pressure, such air would mix with the transmission fluid, rendering it semi-elastic instead of practically incompressible, as it should be. The action of the transmission illustrated upon an elastic or semi-elastic fluid is not entirely satisfactory, and for this reason the elimination of all air from the transmission is desirable.

Figure 5:
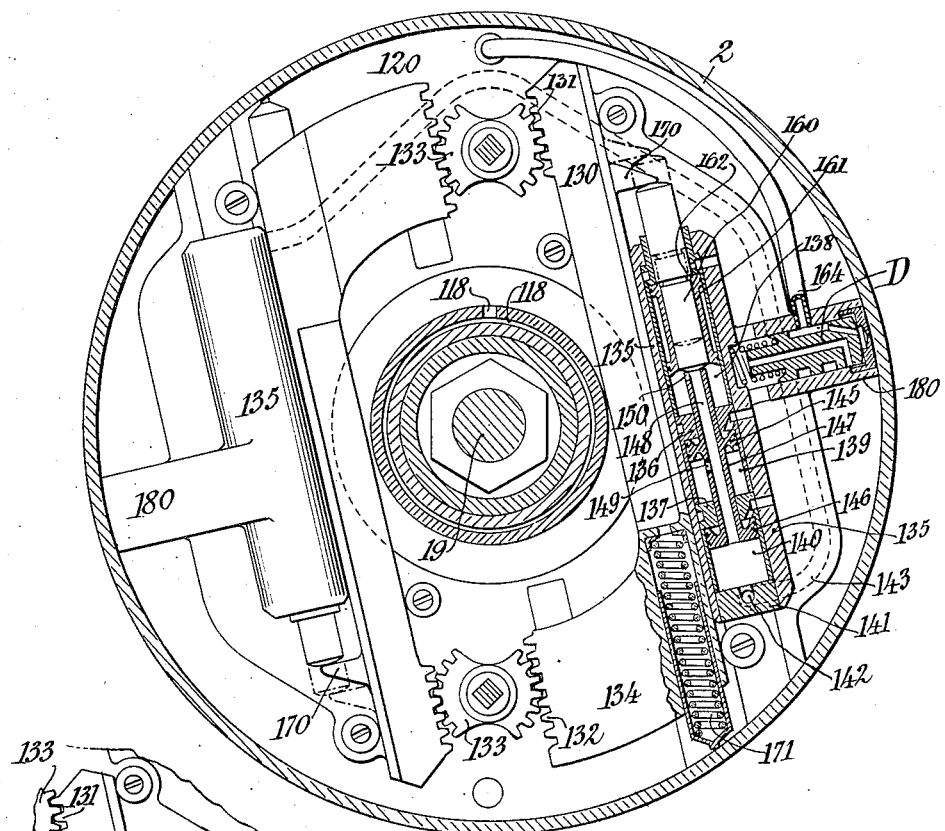
Fig. 5 is a vertical cross-section taken through the automatic valve control mechanism situated to the right of the transmission pumps in Fig. 2, the section being taken along the line V—V.

For a full explanation of the principle of operation of the automatic valve control mechanism shown in Fig. 5, reference may be had to the inventor's co-pending United States applications previously referred to. Certain details of construction will be herein pointed out which render such control particularly applicable to the present transmission primarily because these details relate to a construction by which the space occupied by the automatic valve control may be materially reduced and the entire hydraulic transmission thereby housed within a member taking the place of the ordinary engine fly wheel and occupying no greater space than the usual fly wheel, thus rendering the transmission adaptable to existing automobiles, the whole device being readily inserted between the engine and the propeller shaft of the present automobiles. Two complete valve control devices are illustrated in Fig. 5, one to the right, and one to the left of the driven shaft 19. Only one of these devices will be described, it being borne in mind that the two are in every respect identical. The control is duplicated for two purposes: first, to insure a perfect dynamic balance between the two sides of the transmission, and second, to double the control force that would be exerted by only a single control mechanism.

The housing 2, as previously described, is driven directly by the engine. Within this housing to the right of the pumps A and B and in a separate compartment 120 are mounted the two valve control devices, one of which will now be described. A rack bar 130 is slidably mounted on the transmission casting in such manner that its two racks 131 and 132 will respectively engage the pinions 133 controlling the main valves 11. The two main valves 11 are shown in section in Fig. 4, but both do not appear in Fig. 2 for the reason that the section line is not taken along the diameter of the transmission but along two different radii, as indicated by line II—II in Fig. 3. The rack bar takes the form of an L, the lower arm 134 of which is designed to have considerable mass. This mass being disposed at a considerable distance from the axis of rotation of the housing will be subjected to a relatively large centrifugal force when the housing is rotated, and this force will at all times be governed by the speed of rotation of the housing. In close proximity to the rack bar 130, a cylinder 135 is provided, the cylinder being divided by transverse partitions 136 and 137 into three pressure chambers 138, 139 and 140 respectively. The lower end of the cylinder 135 is closed by a head 141, through which head a bore 142 communicates with a channel 143 which delivers fluid to the pressure chambers of the cylinder 135 under certain conditions as will hereinafter be more fully set forth.

Within the pressure chambers 139 and 140 are positioned two pistons 145 and 146 respectively, as shown, the two pistons acting in tandem upon the common piston rod 147. A bore 148 is provided within said piston rod, which bore, through ports 149 and 150, communicates with the pressure chambers 139 and 138 respectively so that when fluid is admitted to the pressure chamber 140 it will act upon the piston 146 in such chamber and will also flow through the bore of the piston rod and act upon the piston 145 in pressure chamber 139. The fluid will also enter through the described bore and port 150 the pressure chamber 138, where it will act upon a compound piston comprising an inner plunger 160 and a relatively slidable sleeve piston 161 of annular cross-section. The said sleeve piston freely slides within the cylinder 135 but is provided with piston rings or other suitable packing means for rendering its contact with the cylinder walls substantially fluid-tight. The plunger 160, freely slidable within the said sleeve piston, also is effectively sealed therein, so that no fluid will pass between the plunger and the sleeve piston.

Figure 6:
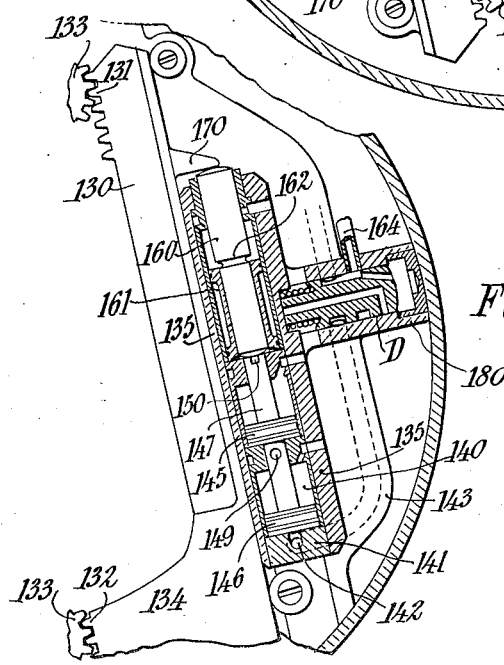
Fig. 6 shows the same view as Fig. 5, except that the valve control pistons and the pilot valve are shown in different positions.

The sleeve piston 161 acts against a shoulder 162 on the plunger in such manner that so long as the said sleeve piston is not in contact with the end of the cylinder 135, its thrust will be added to the thrust of the plunger. According to the arrangement described, the plunger will, however, continue beyond such point in its outward movement without the assistance of the thrust of the sleeve piston 161. Substantially the same explanation is applicable to the action of pistons 145 and 146. These two pistons only exert a thrust upon the plunger 160 while they are in the position illustrated in Fig. 6 and while moving to that shown in Fig. 5. When they reach the position shown in Fig. 5, they are checked against further upward movement by coming in contact with the partitions 136 and 137 respectively, and beyond this point cannot exert any thrust upon the plunger 160 through the operative connection, otherwise afforded by the piston rod 147. The upper end of such piston rod is adapted to engage the end of the plunger 160 when such plunger is in any position lower than that indicated in Fig. 5. Thus, when the plunger 160 is in the position shown in Fig. 6, it will be subjected to the combined fluid pressure acting upon the three pistons 146, 145 and 161, and also by the fluid pressure acting directly upon its own effective pressure area. By the above described construction, it will be apparent that there is provided in a cylinder of limited bore, such as the cylinder 135, a compound piston arrangement, which, in the position in which all the pistons are active, the combined effective pressure area of the device is three times that which would be afforded by a similar valve control which had only a single piston. After the upward movement of the three pistons 145, 146 and 161 has been stopped, as described, the plunger 160, if its relatively small effective pressure area be subjected to a sufficiently augmented fluid pressure, will continue to move outward to a position indicated in dotted lines (Fig. 5). Thus the valve control piston device has two distinct positions of rest, one determined by the point at which certain of the pistons are checked in their upward or outward movement, and another, in which after the movement of the plunger 160 is continued without the aid of the thrust of the other pistons, such plunger is brought to rest by another stop provided for this purpose, which latter position is indicated in dotted lines in Fig. 5.

The thrust of the plunger 160 is imparted to the rack bar 130 through a projection 170 on such bar, the movement of the rack bar in a direction similar to that in which the bar is acted upon by the plunger 160 is further assisted by a coil spring 171 mounted within a bore in the weighted end 134 of the rack bar. The forces of the spring and the fluid actuated plunger are at all times opposed to the centrifugal force acting upon the weighted end 134 of the rack bar. Centrifugal force always acts on the rack bar in a direction tending to rotate the transmission control valve to a position corresponding to direct drive, whereas the fluid pressure acting upon the combined piston device through plunger 160 tends to move the valve in the opposite direction and establish a reduced transmission ratio, and in extreme cases to carry the control valve to a point at which it permits the slipping clutch action in the delivery pump to take place. If the speed of the engine remain constant, at say 1000 R. P. M., and the torque load be increased, if the transmission control valve is set in the position corresponding to direct drive, the following action will take place: The increasing torque load will produce an increased fluid pressure within the transmission. This fluid pressure will be communicated to the control cylinder 135, and upon reaching an intensity sufficient to overcome the centrifugal force acting on the weight 134, will shift the rack bar to the position indicated in Fig. 5, the pressure during this movement acting upon all four pistons 146, 145, 160 and 161 to produce the necessary thrust. This will set the transmission in a reduced gear ratio, which, if the load be not too great, will be sufficient to enable the engine rotating at 1000 R. P. M. to continue to carry the load. If, however, the load be of such magnitude that even in a reduced transmission speed the engine is overloaded to a point that would otherwise compel it to slow down, there will be sufficient fluid pressure within the cylinder to move the plunger to the position shown in dotted lines in Fig. 5, such pressure acting at this time solely upon the effective pressure area of the plunger itself. A movement of the plunger from the position shown in Fig. 5 in full lines to that shown in Fig. 5 in dotted lines will permit the hydraulic slipping clutch action to gradually increase. This slipping clutch action will prevent the engine from slowing down and permit it to run at a speed somewhere in the neighborhood of the speed at which the engine develops its maximum torque.

Now let us suppose that the engine throttle is opened wider and the engine gradually increases its speed. The increase in engine speed will result in an increased centrifugal force acting upon the weight 134, which, when it attains a certain degree, will be sufficient to overcome the fluid pressure acting upon the effective pressure area of the plunger alone, and such centrifugal force will move the plunger into the position shown in full lines in Fig. 5, which position corresponds to the normal hydraulic gear reduction of the transmission in reduced speed. A further increase in engine speed will result in the development of sufficient centrifugal force acting upon the weight 134 to overcome the combined pressures of all the pistons and carry them to the position shown in Fig. 6, which position corresponds to direct drive.

The communication between the cylinder 135 in which the valve control pistons are located, and the pressure chamber of the delivery pump of the transmission (pump A), is regulated by an auxiliary or pilot valve "D" in a casing 180 which valve is fully described in my aforesaid United States Patent No. 1,673,542, granted June 12, 1928, to which reference should be made for a complete disclosure thereof.

While only a single embodiment of the invention has been hereinbefore particularly described and illustrated, it is to be understood that the invention is not limited to such embodiment but may be otherwise variously embodied and modified without departing from the spirit of the invention, as set forth in the following claims.

What I claim is:

1. A power transmission device comprising a hydraulic clutch and change speed mechanism, a mechanical change speed gear, clutch-braking means adapted to resist the rotation of the driven part of said hydraulic mechanism, a gear shifting element, and an operative connection between said element and said braking means whereby the latter will be automatically caused to act as a clutch brake to resist the motion of the said driven part when the said gear shifting element is moved toward neutral position.

2. A power transmission device comprising a hydraulic transmission and a mechanical change speed gear, the former having a driving and a driven part, said driven part being releasable for free rotation whereby to unclutch the power from the driving parts of said change speed gear, frictional means adapted to bring the driving parts of the said gear to a rotational speed commensurate with the speed of the driven parts of said gear whereby to permit the engagement of the said driving and driven parts of the change speed gear without shock, gear shifting mechanism, and an operative connection between said mechanism and said frictional means whereby when the said gear shifting mechanism is operated the said frictional means will bring the driving and driven parts of the change speed gear into proper speed relationship for smooth engagement.

3. A transmission device according to claim 2, said frictional means being a fluid pump having means for restricting the flow of fluid.

4. A transmission device according to claim 2, said frictional means being a rotary fluid pump comprising a casing having an abutment and a relatively rotary part having vanes, the means for controlling flow through said pump comprising a movable part adapted in one position to serve as such abutment and in another position to permit free flow between the chambers of the pump.

5. A power transmission device comprising a mechanical change speed gear, a clutch, a clutch brake, a gear-shifting means, and an operative connection between said means and said clutch brake whereby the clutch brake will be automatically applied when the said shifting means of the mechanical gear is set in the neutral position, the said clutch brake being a fluid pump operatively connected to the driven element of the clutch and having means for restricting the flow of fluid whereby to resist the rotation of the said driven element.

6. A power transmission device comprising a mechanical change speed gear, a clutch, and a clutch brake, the latter being a rotary fluid pump comprising a casing having an abutment and a relatively rotary part having vanes, the means for controlling flow through said pump comprising a movable part adapted in one position to serve as such abutment and in another position to permit free flow between opposite chambers of the pump, and a connection between said movable part and the gear shift lever adapted to interpose it as such abutment to restrict the flow when said lever is in neutral position and displace it to open such free flow as the lever is moved from neutral position.

7. In a vehicle, a power transmission device comprising a mechanial change speed gear, a clutch through which such gear is driven, a hydraulic pump applied between said clutch and change speed gear, adapted to retard the releasable member of said clutch, and hydraulic brake actuating means for the vehicle, said means receiving fluid pressure from said pump.

In witness whereof, I have hereunto signed my name.

SVEN GUSTAF WINGQUIST.